May 20, 1941.  C. H. TRAVER  2,242,930
DRAFT DEFLECTOR
Filed April 26, 1937
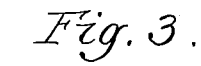
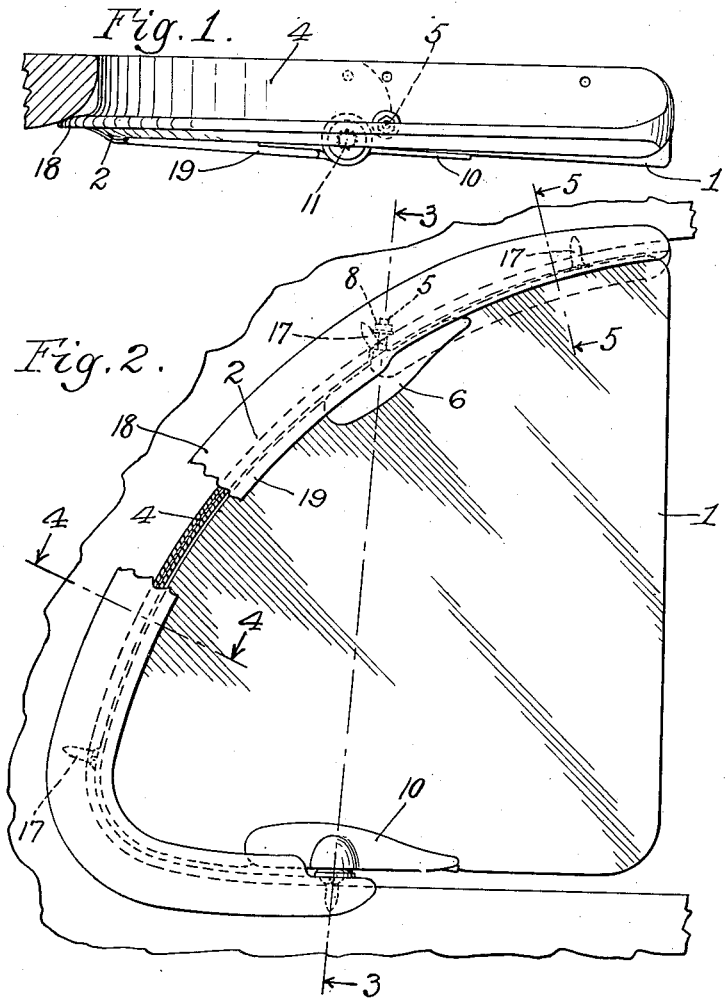
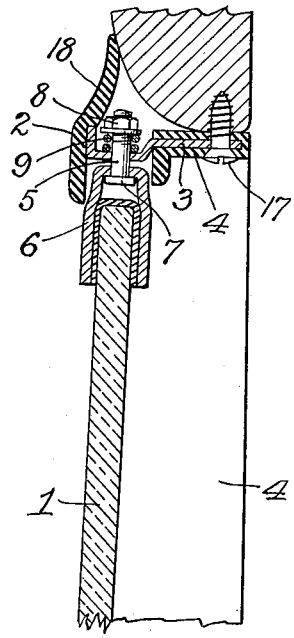
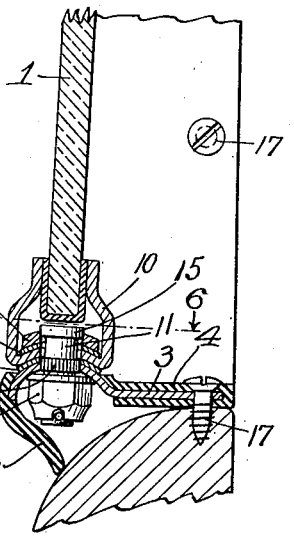
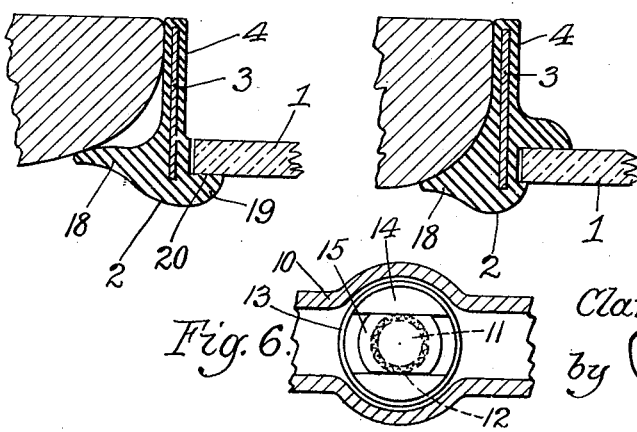
Inventor
Clarence H. Traver
by Parker & Carter
Attorneys.

Patented May 20, 1941

2,242,930

UNITED STATES PATENT OFFICE 2,242,930

DRAFT DEFLECTOR

Clarence H. Traver, Chicago, Ill., assignor to The Dole Valve Company, Chicago, Ill., a corporation of Illinois Application April 26, 1937, Serial No. 138,871

6 Claims. (Cl. 296—84)

This invention relates to draft deflectors and has for its object to provide a new and improved device of this description. The invention has for a further object to provide a draft deflector which is attached to the reveal of the window of an automobile and which can be moved to different angular positions. The invention has for a further object to provide a draft deflector having a glass with a frame member extending around the front of the glass and along a part of the bottom thereof and to which the glass is pivotally mounted. The invention has for a further object to provide such a draft deflector wherein the frame to which the glass is attached is made of metal and is embedded in non-metallic material such as rubber. The invention has further objects which are more particularly pointed out in the accompanying description.

Referring now to the drawing,

Fig. 1 is a plan view of one form of draft deflector in position in the window, showing a portion of the window frame in section;

Fig. 2 is an enlarged front view of Fig. 1;

Fig. 3 is an enlarged sectional view taken on line 3—3 of Fig. 2;

Fig. 4 is an enlarged sectional view taken on line 4—4 of Fig. 2;

Fig. 5 is an enlarged sectional view taken on line 5—5 of Fig. 2; and

Fig. 6 is an enlarged sectional view taken on line 6—6 of Fig. 3.

Like numerals refer to like parts throughout the several figures.

Referring now to the drawing, I have illustrated one form of draft deflector comprising a glass 1 and a frame member 2, the frame member extending along the front of the glass member and a portion of the bottom thereof. The frame member 2 consists of a metal member 3 embedded in non-metallic material 4, such as rubber, the metal being concealed by the rubber. The glass is pivotally mounted upon the metal member in any desired manner. As herein shown, there is an upper pivot 5 which passes through the metal member 3 and which is connected with the pivot support 6 attached to the glass. The pivot 5 has an enlargement 7 which holds it in the pivot support 6. A nut 8 on the other end holds it in the metal member 3 and there is preferably an anti-rattle device such as a spring 9 between the nut and the metal member 3.

Attached to the bottom of the glass is a pivot support 10 which carries a pivot 11. This pivot passes through an opening in the pivot support 10 and through an opening in the metal member 3. The pivot 11 is held against rotation in any desired manner. As herein shown the metal member 3 through which the pivot passes is provided with teeth and the pivot at the point located in this opening, is also provided with teeth 12 which fit between the teeth in the frame member 3. There are friction members 13 for frictionally engaging the pivot support 10 and the metal member 3. There is also means of pressing these friction members against their associated parts to secure the proper amount of friction. As herein shown this is brought about by providing a member 14 on the interior of the pivot support 10. The pivot is provided with the head 15 which engages the member 14. The pivot is provided with a nut 16 at its lower end, the parts arranged so that when the nut is tightened, the friction members will be tightly pressed against the associated parts so as to secure the desired amount of friction.

The frame member 3 projects laterally inwardly from the glass and extends along the reveal of the window and is attached in position by means of the fastening devices 17.

The non-metallic covering for the frame member engages the reveal of the window so as to make a sealing joint. This non-metallic member is provided with a sealing member 18 which extends preferably entirely therealong and which engages the outer face of the window frame, as clearly shown in Figs. 1, 2, 3 and 4. There is also a sealing member 19 which projects in the opposite direction from the frame member 3 and which has a face 20 which is engaged by the glass when the glass is in its closed position, as clearly shown in Fig. 4.

The frame and the glass and associated parts are made up at the factory and form a unit and all that is necessary to fasten this unit in position on the automobile is to insert and tighten the screws 17. It will be seen that in this construction the metal frame is embedded in the non-metallic material and that this metal frame and the non-metallic material extends continuously along the edge of the glass from one pivot to the other and that it also extends beyond the upper pivot to the rear edge of the glass.

The head 15 has flattened sides, shown in Fig. 6, so that it may be inserted through the opening in the part 14 when the pivot is being placed in position, and then turned so as to be held against removal.

I claim:

1. A draft deflector comprising a glass, two pivots connected with the glass, one at the bottom and the other at the top thereof, and a metal frame extending around the edge of the glass from one pivot to the other, the pivots being connected with said metal frame, that portion of the metal frame on the side of the glass toward the automobile being within the plane of the window frame, and a projecting part connected to the metal frame extending in a generally vertical direction past the metal frame and engaging the face of the window frame beyond the boundaries of the metal frame.

2. A draft deflector comprising a glass, two pivots connected with the glass, one at the bottom and the other at the top thereof, a frame extending around the edge of the glass from one pivot to the other, the pivots being connected with said frame, said frame having a portion which projects laterally and inwardly and which engages the opposed upper and lower faces of the window frame and a portion which engages the outer face of the window frame, fastening devices for fastening the part which engages the opposed upper and lower faces of the frame in position, said fastening devices also acting to hold the portion which engages the outer face of the window frame into contact with said outer face.

3. A draft deflector for attachment to the window frame of an automobile, comprising a glass, two pivots connected with the glass, one at the bottom and the other at the top thereof, a friction device associated with said bottom pivot, an adjusting device for adjusting the friction device, a metal frame extending around the edge of the glass from one pivot to the other, the pivots being connected with said metal frame, and continuous non-metallic material surrounding said metal frame, said non-metallic material having a portion which projects beyond the said adjusting device and engages the face of the window frame so as to conceal the adjusting device.

4. A draft deflector comprising a glass, two pivots connected with the glass and in alignment therewith, one at the bottom and the other at the top thereof, a metal frame extending around the edge of the glass from one pivot to the other, the portion of the metal frame on the side of the glass toward the automobile being within the plane of the window frame and being attached to the opposed horizontal faces of the window frame, the pivots being connected with said metal frame, and an anti-rattling device associated with said pivot at the top of said glass.

5. A draft deflector comprising a glass, two pivots connected with the glass, one at the bottom and the other at the top thereof, a metal frame extending around the edge of the glass from one pivot to the other, the pivots being connected with said metal frame, and non-metallic material connected with said metal frame and interposed between the metal frame and the window frame with which the draft deflector is associated, said non-metallic material having a portion which projects toward the glass and which engages the face of the glass when the deflector is in its closed position, to form a sealing joint between them.

6. A draft deflector for attachment to the window frame of an automobile, comprising a glass, two pivots connected with the glass, one at the bottom and the other at the top thereof, and a metal frame extending around the edge of the glass from one pivot to the other, the pivots being connected with said metal frame, said metal frame embedded in compressible non-metallic material and being located within the window opening, and fastening devices which extend through the metal frame and the non-metallic material for fastening the device in position, said non-metallic material engaging the window frame around the fastening device on one side of the metal frame and engaging the fastening device on the other side of the metal frame, said non-metallic material being compressed when the fastening devices are placed in position.

CLARENCE H. TRAVER.